United States Patent [19]
Oosterling

[11] Patent Number: 6,062,164
[45] Date of Patent: *May 16, 2000

[54] DEVICE AND METHOD FOR AUTOMATICALLY MILKING ANIMALS

[75] Inventor: Pieter Adriaan Oosterling, Vijfhuizen, Netherlands

[73] Assignee: Prolion B.V., Netherlands

[*] Notice: This patent is subject to a terminal disclaimer.

[21] Appl. No.: 09/082,567

[22] Filed: May 21, 1998

Related U.S. Application Data

[63] Continuation-in-part of application No. 08/776,416, Jan. 28, 1997, Pat. No. 5,782,199, application No. PCT/NL95/00261, Jul. 27, 1995.

[30] Foreign Application Priority Data

Jul. 28, 1994 [NL] Netherlands ............................ 9401238

[51] Int. Cl.[7] ...................................................... A01J 5/00
[52] U.S. Cl. ...................................... 119/14.02; 119/14.03
[58] Field of Search ............................... 119/14.01, 14.02, 119/14.03, 14.04, 14.14, 14.08, 14.1

[56] References Cited

U.S. PATENT DOCUMENTS

| 4,000,718 | 1/1977 | Brown | 119/14.03 |
|---|---|---|---|
| 5,069,160 | 12/1991 | Street et al. | 119/14.08 |
| 5,782,199 | 7/1998 | Oosterling | 119/14.02 |

FOREIGN PATENT DOCUMENTS

| 0551956 | 7/1993 | European Pat. Off. | A01J 7/00 |
|---|---|---|---|
| 3702465 | 8/1988 | Germany | A01J 5/00 |
| 8903163 | 7/1991 | Netherlands | A01K 11/00 |

OTHER PUBLICATIONS

Database WPI, Section PQ, Week 9131, Derwent Publications, Ltd., London, GB, Class P14, AN 91–228403.

Primary Examiner—Thomas Price
Attorney, Agent, or Firm—Webb Ziesenheim Logsdon Orkin & Hanson, P.C.

[57] ABSTRACT

A device and method is provided for automatic milking animals. The device includes comprising inter alia one or more milking stalls each provided with an entrance gate and an exit gate, a control system for controlling the automatically milking of the animal, a waiting area where the animals are waiting before entering the milking stalls and an exit area, connected to the exit gate of a milking stall, wherein a switchable gate is provided for connecting a milking stall with the waiting area so the cow can, after the exit gate is opened, walk to either the waiting area or the exit area and which area is available to her will depend on whether the milking has been finished successfully.

3 Claims, 1 Drawing Sheet

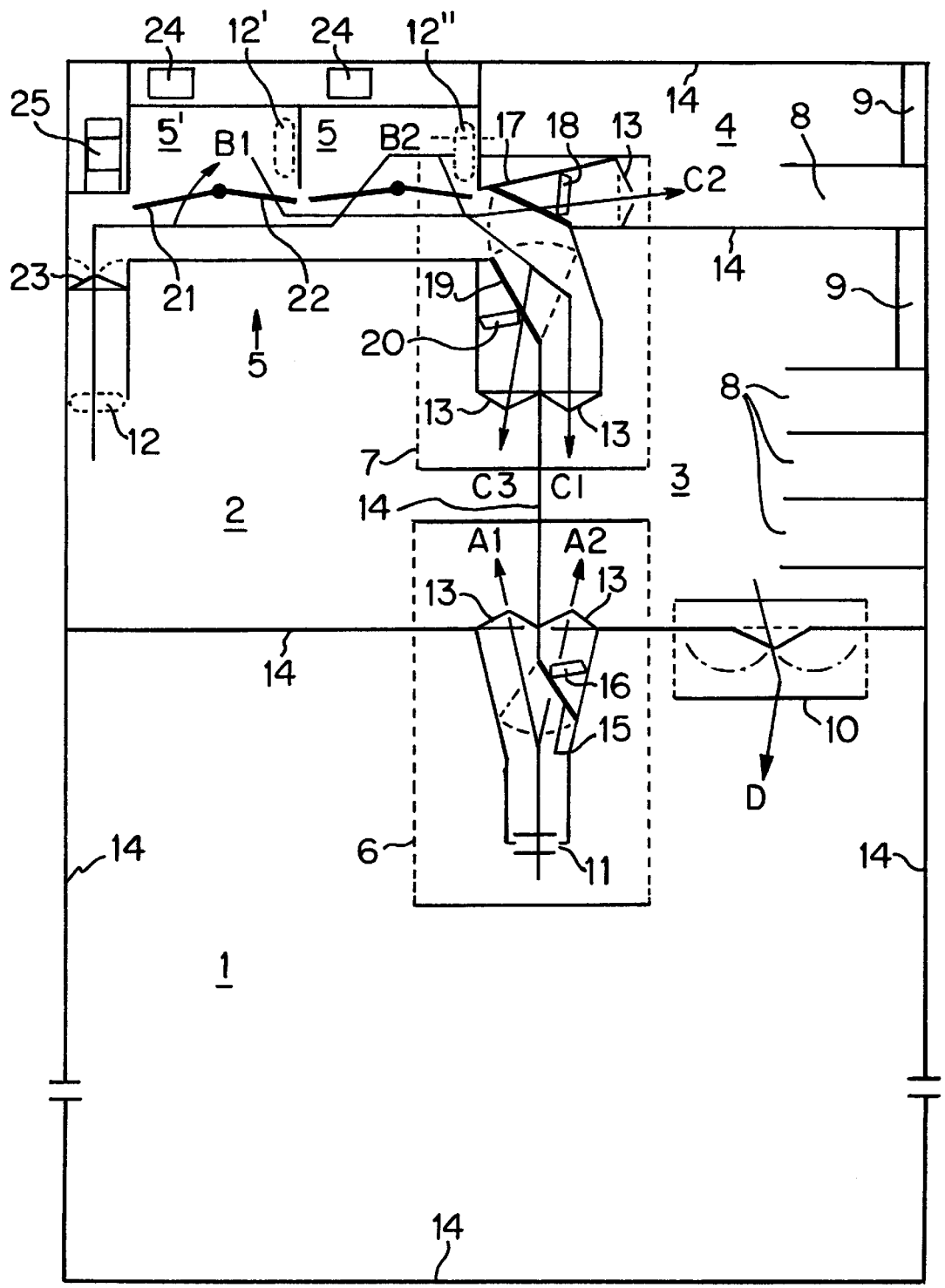

DEVICE AND METHOD FOR AUTOMATICALLY MILKING ANIMALS

CROSS REFERENCE TO RELATED APPLICATION

This application is a continuation-in-part of U.S. Pat. application Ser. No. 08/776,416, filed Jan. 28, 1997, now U.S. Pat. No. 5,782,199, and entitled "Device and Method for Automatically Milking of Animals", which is the national phase of International Application No. PCT/NL95/00261, filed on Jul. 27, 1995, which corresponds to Netherlands Patent Application No. 9401238 filed on Jul. 28, 1994.

BACKGROUND OF THE INVENTION

The invention relates to a device for automatically milking animals comprising inter alia one or more milking stalls each provided with an entrance gate and an exit gate, a control system for controlling the automatic milking of the animal, a waiting area where the animals are waiting before entering the milking stalls and an exit area, connected to the exit gate of a milking stall.

Such devices are known inter alia from EP 0 567 191, in which a device is described where cows are automatically milked and which device is placed between a waiting area and an exit area.

The disadvantage of the known device is that after a cow has been in the milking stall she cannot automatically be sent to the waiting area. This means that without the intervention of the farmer it is not possible to bring a cow into the milking stall for a second time, when the attaching of the teat cups to the teats or the other aspects of milking have not been successful. In automatic milking the influence of the placing robot on the behaviour of the cow might give rise to nervousness in the animal and when the first time placing of the teat cups on the teats has not been successful then it gets more and more difficult to place the teats in a second try or a third try, as the increased nervousness of the cow prevents that.

SUMMARY OF THE INVENTION

The object of the invention is to provide a device in which a cow can be guided back from the milking stall into the waiting area, so that she may enter the milking stall a second time. Thereto in accordance with the invention a switchable gate is provided for connecting a milking stall with the waiting area. By providing a switchable gate the cow can, after the exit gate is opened, walk to either the waiting area or the exit area and which area is available to her will depend on whether the milking has been finished successfully.

The invention also concerns a method for milking animals wherein the animals are admitted from a waiting area into a milking stall, teatcups are automatically placed under control of a control system on the teats of the animal by a placing robot and after milking gates are opened, so that the animal can walk from the milking stall. Such a method is also known from the above stated EP 0 567 191, wherein it is assumed that after the exit gate of the milking stall has been opened the animal will walk directly to the exit area. As indicated above this is not always a good method to follow, when the animal has not been milked properly.

The invention has for its object to obviate above-mentioned drawback and therefor the invention is distinguished in that the gates are opened by the control system in such a way that the animal can walk from the milking stall to the waiting area if the control system determines that the placing of the teatcups on the teats or the milking has not been completed successfully. It is thereby possible that the animal is guided back to the waiting area and can enter the milking stall for a second time.

BRIEF DESCRIPTION OF THE DRAWING

The drawing FIGURE is a schematic plan view of the milking device of the invention.

DESCRIPTION OF THE PREFERRED EMBODIMENT

Shown in the FIGURE is a schematic overview of the diverse areas in which a herd of free-ranging cows provided with identification means is accommodated during the day. The herd, which may consist of several dozen to more than 100 cows, normally occupies a lying and walking area 1 which communicates by means of an access gate 6 provided with an identification system 11 with a waiting area 2 and an exit area or feeding and watering space 3. A swivel gate 15 operated with an air cylinder 16 is incorporated in the access gate.

The waiting area 2 joins onto a milking parlour 5 which is connected via an exit fence 7 to a segregation area 4, the feeding and watering space 3 and the waiting area 2. The size of waiting area 2 depends on the capacity of milking parlour 5 and the number of animals in the herd. It is conceivable that the waiting area 2 takes such a large form that the wait-time for the cows in waiting area 2 can amount to a maximum of one hour.

Incorporated in the exit fence 7 is a second switchable or swing gate 17 operated by an air cylinder 18 in addition to a first switchable or swing gate 19 operated by an air cylinder 20.

The swing gates 15, 17 and 19 can of course also be operated in different manner, and there are for instance electrically controlled actuators instead of air cylinders 16,18 and 20.

The feeding and watering space 3 is connected via an exit fence 10 to the lying and walking area 1. The diverse spaces are separated from each other and from the surrounding area by a fence 14. Openings (not shown) can be made by hand in this fence by the operator, as is necessary for instance when the operator leads cows out of the segregation area 4 to other areas, such as for instance the milking parlour 5. In the lying and walking area 1, the segregation area 4 and the feeding and watering space 3 can be placed cubicles (not shown) in which the cows can rest.

Both the access gate 6 and the exit fence 7 are provided at each exit with a one-directional gate 13 so that cows cannot walk back. Such one-directional gates can for instance fall back into the closed position due to the force of gravity, although it is also possible for them to be carried into the closed position with a spring on each swinging part. The dimensions of the passageways are also such that the animals cannot turn round in the various passageways.

Arranged in milking parlour 5 is a milking stall 5' and a milking stall 5" which are both provided with a milking installation (not shown) including teat cups which are arranged round the teats of the cow for milking. Each milking stall 5' or 5" is provided with an entrance gate 21 and an exit gate 22. A placing robot 24 can couple the teat cups to the teats of the cow in both milking parlours 5' and 5". Access to milking stalls 5' and 5" from the waiting area 2 proceeds via the identification system 12 and the entrance gate 23.

In another embodiment an identification system 12' or 12" is arranged in each milking stall 5' or 5" instead of the identification system 12 at the entrance to the milking parlour 5.

A feeding stall 8 and a drinking trough 9 are placed in both the segregation area 4 and in the feeding and watering area 3. The feeding stall 8 is suitable for providing feed concentrate to the cows and is provided for this purpose with an identification system so that each individual cow receives the dosage to which it is entitled. Optionally there are also feeding stalls where bulk fodder is supplied to the cows.

From the feeding and watering area 3 the cow can return to the lying and walking area 1 via an exit gate 10. This exit gate 10 is embodied such that the exit gate 10 is preferably always open in the direction toward the lying and walking area 1. Exit gate 10 can however also be adjusted to open in both directions.

The device is controlled by a control system 25 which is coupled to the diverse identification systems, the diverse gates, the placing robot 24 and the milking installation. The operation of the device is as follows:

From the moment that milking time begins the exit gate 10 is adjusted, for instance by control means present in the gate and controlled by control system 25, such that the cows can only walk in a direction D through exit gate 10.

Any cow which wishes to eat or drink will now be able to pass only via the access gate 6 to the feeding and watering area 3. The cow is identified in access gate 6 by the identification system 11 and guided in a direction A1 if it must be milked. Cows which have already been milked or which are dry are guided in a direction A2 and thus have direct access to the drinking trough 9 or the feeding stall 8.

Cows in the waiting area 2 will proceed toward the milking parlour 5, pass through the identification system 12 and wait in front of the entrance gate 23. Identification may optionally take place in milking stall 5' or 5". If milking stall 5' (optionally 5") is available, exit gate 22 then closes and entrance gate 21 and entrance gate 23 open. The cow now walks in a direction B1 (optionally B2), gate 21 closes and the placing robot 24 places the teat cups round the teats and milking begins.

During the stay in milking stall 5' (or 5"), three situations may occur: In the most frequently occurring situation the cow is milked normally and will leave milking stall 5' in a direction C1 after opening of exit gate 22. Should it be established during milking that the cow requires particular attention, for example if a mastitis infection is detected or in the case the operator has entered into the control beforehand that the cow must be segregated, the cow will then leave milking stall 5' in a direction C2. Should it be found that connection of the teat cups round the teats has not been successful, for instance if connection has not succeeded after 3 to 5 attempts or after a period of 3 minutes, the cow is then guided in a direction C3, whereafter it can re-enter milking parlour 5 after a time.

It is possible that the waiting area 2 is so full of cows that there is only room for animals which come out of milking parlour 5 via direction C3. An additional entrance gate can then be placed in access gate 6, whereby milk-ripe animals are not admitted into waiting area 2 and remain in the lying and walking area 1. An alternative in this situation is to guide all animals arriving at the access gate 6 in the direction A2 to the feeding and watering area 3 and by means of the control 25 to prevent the animals being supplied with feed in feeding stall 8. After a time they will then return to access gate 6 and can then be admitted into waiting area 2.

It has been found in practice that it is important to stimulate the animals and to urge them for instance with coercive means out of walking area 1 to milking parlour 5. These coercive means (not shown) may consist for instance of movable fences on which inter alia electrical stimulating means are arranged.

What is claimed is:

1. A device for automatically milking animals, comprising:
    at least one milking stall having an entrance gate and an exit gate;
    a control system for controlling the automatic milking of an animal;
    a waiting area where the animals are waiting before entering the at least one milking stall;
    an exit area connected to the exit gate of the at least one milking stall; and
    a first switchable gate connecting the at least one milking stall with the waiting area.

2. The device in accordance with claim 1, including a second switchable gate for connecting the at least one milking stall with a segregation area.

3. A method for automatically milking animals, comprising the steps of:
    admitting the animals from a waiting area into a milking stall;
    controlling the milking by a control system;
    after milking, opening gates to allow the animal to walk from the milking stall; and
    opening the gates by the control system such that the animal is directed from the milking stall to the waiting area when the control system determines that the placement of teatcups on the animal's teats or the milking operation has not been completed successfully.

* * * * *